(12) United States Patent
Stummer

(10) Patent No.: US 8,857,166 B2
(45) Date of Patent: Oct. 14, 2014

(54) HYDROELECTRIC POWER PLANT

(75) Inventor: Manfred Stummer, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 1117 days.

(21) Appl. No.: 12/602,714

(22) PCT Filed: May 29, 2008

(86) PCT No.: PCT/EP2008/004268
§ 371 (c)(1),
(2), (4) Date: Jan. 13, 2010

(87) PCT Pub. No.: WO2008/148497
PCT Pub. Date: Dec. 11, 2008

(65) Prior Publication Data
US 2010/0133841 A1    Jun. 3, 2010

(30) Foreign Application Priority Data

Jun. 5, 2007 (DE) .......................... 10 2007 026 277

(51) Int. Cl.
| | |
|---|---|
| *F03B 13/08* | (2006.01) |
| *F03B 13/00* | (2006.01) |
| *F03B 3/02* | (2006.01) |
| *F03B 11/04* | (2006.01) |
| *E02B 9/00* | (2006.01) |
| *F03B 3/06* | (2006.01) |

(52) U.S. Cl.
CPC .............. *E02B 9/00* (2013.01); *F05B 2240/40* (2013.01); *F03B 13/00* (2013.01); *Y02E 10/22* (2013.01); *F03B 3/02* (2013.01); *F03B 11/04* (2013.01); *Y02E 10/223* (2013.01); *F03B 13/08* (2013.01); *Y02E 10/226* (2013.01); *F03B 3/06* (2013.01)
USPC ............................................ 60/398; 415/143

(58) Field of Classification Search
USPC ............................................ 60/398; 415/143
See application file for complete search history.

(56) References Cited

U.S. PATENT DOCUMENTS

| | | | | |
|---|---|---|---|---|
| 1,273,704 | A | * | 7/1918 | White ............................ 60/398 |
| 3,163,118 | A | * | 12/1964 | Baumann ....................... 60/398 |
| 3,796,051 | A | * | 3/1974 | Kuwabara ...................... 60/398 |
| 4,120,602 | A | | 10/1978 | Megnint |

(Continued)

FOREIGN PATENT DOCUMENTS

| | | |
|---|---|---|
| CH | 597.134 | 8/1925 |
| CH | 283184 | 5/1952 |

(Continued)

OTHER PUBLICATIONS

First Office Action in corresponding Chinese Application No. 200880018995.7, filed May 29, 2008.

(Continued)

*Primary Examiner* — Thomas E Lazo
(74) *Attorney, Agent, or Firm* — Faegre Baker Daniels LLP

(57) ABSTRACT

The invention relates to a hydropower plant
  having a flow pathway, which has an upper water level and a lower water level;
  having two turbines, which are connected in series in the flow pathway, each comprising a rotor, a housing, and a draft tube.

Figure 1:
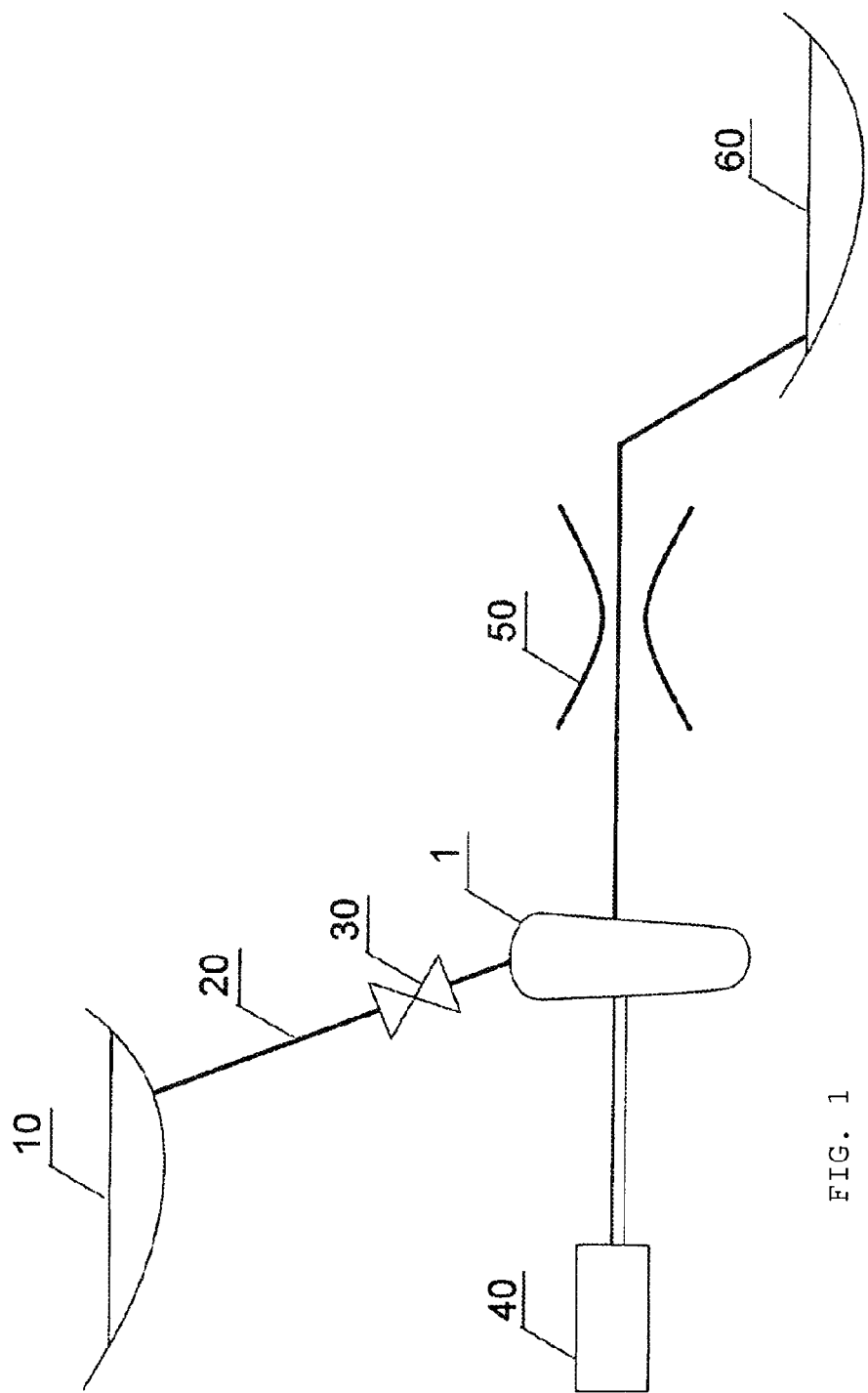

The invention is characterized by the following features:
  the first machine viewed in the flow direction is a radial or semi-axial or axial flow turbine;
  the second machine viewed in the flow direction is a radial, semi-axial, or axial flow turbine.

15 Claims, 3 Drawing Sheets

(56) References Cited

U.S. PATENT DOCUMENTS

| | | | | |
|---|---|---|---|---|
| 4,441,029 A | * | 4/1984 | Kao | 290/52 |
| 4,475,334 A | * | 10/1984 | Kuwabara | 60/398 |
| 4,674,279 A | * | 6/1987 | Ali et al. | 60/398 |
| 4,794,544 A | * | 12/1988 | Albright et al. | 290/43 |
| 4,991,397 A | * | 2/1991 | Varsa | 60/398 |
| 5,436,507 A | * | 7/1995 | Brown et al. | 290/52 |
| 5,754,446 A | * | 5/1998 | Fisher et al. | 290/43 |
| 5,864,183 A | * | 1/1999 | Fisher et al. | 290/43 |
| 5,997,242 A | * | 12/1999 | Hecker et al. | 415/72 |
| 6,926,494 B2 | * | 8/2005 | Sabourin | 415/160 |

FOREIGN PATENT DOCUMENTS

| | | | |
|---|---|---|---|
| CH | 283184 | * | 9/1952 |
| CN | 2886111 | | 4/2007 |
| DE | 33 24 672 | | 1/1985 |
| EP | 1215393 A1 | * | 6/2002 |
| FR | 2 839 121 | | 10/2003 |
| JP | 11-159433 | | 6/1999 |
| KR | 2001-0106598 | | 12/2001 |
| KR | 20-0341899 | | 2/2004 |
| WO | 94/19604 | | 9/1994 |
| WO | 2006/021975 | | 3/2006 |

OTHER PUBLICATIONS

Office Action dated Mar. 7, 2014 in corresponding Korean Application No. 10-2009-7026840.

* cited by examiner

HYDROELECTRIC POWER PLANT

CROSS-REFERENCE TO RELATED APPLICATION

This application is related to and claims the benefit under 35 U.S.C. §119 and 35 U.S.C. §365 of International Application No. PCT/EP2008/004268, filed May 29, 2008, the reference of which is expressly incorporated herein by reference.

The invention relates to a hydropower plant having a turbomachine, in particular a water turbine, also having an electric generator which is driven by the turbine.

Hydropower plants have become known in various forms. These include, for example, run-of-the-river power plants, which exploit the energy of the flow of the river. Furthermore, storage power plants have become known. These comprise an upper water store and a lower water store. A machine unit is situated between the two, comprising a turbine and a generator. The turbine can be operated as a pump in pump storage plants at times of low energy demand. It then conveys a part of the water contained in the lower water store back into the upper water store.

All types of turbines except for Pelton turbines come into consideration for the purposes of the invention. Thus, for example, Francis turbines, semi-axial turbines, or Kaplan turbines come into consideration. In general, the rotor of the turbomachine, such as the turbine, and the rotor of the generator have the same shaft, but they may also have separate shafts.

In all of these hydropower plants, a fall tube is connected upstream from the turbine. The turbine generally has a spiral intake housing, which directs the water onto the blades of the turbine rotor.

A draft tube is connected downstream from the turbine. It is attached directly to the spiral housing. hi general, it expands in a funnel shape in the flow direction. It opens below the lower water level.

Cavitation is a grave problem in turbomachines. It is extremely disadvantageous; it reduces the efficiency of the machine and can result in significant damage of the participating parts, up to their complete destruction. Compromises must frequently be made in the construction and positioning of the turbomachine in regard to cavitation, which are at the cost of energy exploitation.

The danger of cavitation increases with the fall height, i.e., with the height difference between upper water level and lower water level. In addition, it increases with speed.

Attempts have been made to counteract the cavitation—in addition to design measures—in that the turbomachine is situated a specific amount below the lower water level. This measure is also referred to as "setting". The setting is thus the distance between the lower water level and the turbine rotor. The lowering of the rotor causes construction effort. The lower the rotor is situated, the more material must excavated for the powerhouse. Depending on the geological conditions, this can result in significant outlay, for example, if connected to blasting operations.

The setting is thus decisive for the investment costs of a power plant and thus also for the cost of the kilowatt hour.

Hydropower plants having two turbines connected in series are known. See CH 28 31 84 A and CH 12 64 65 A. However, these hydropower plants have disadvantages. They do not fulfill the function of reducing the cavitation danger to the desired extent. In addition, they are complex and costly to produce.

The invention is based on the object of designing a hydropower plant of the type described at the beginning so that the cavitation danger is reduced and the construction costs, which are connected to a large setting, are simultaneously reduced.

The inventor has found the following solution: he provides two turbines, which are connected in series, in the flow pathway. The first turbine viewed in the flow direction is a radial, semi-axial, or axial flow turbine. The second turbine viewed in the flow direction is a radial, semi-axial, or axial flow turbine. The first turbine can be a Francis turbine, and the second turbine can be a Kaplan turbine, for example.

It is expedient to connect the two turbines directly in sequence, thus without an interposed throttle or without an interposed surge tank. The rotational axes of the rotors of the turbines may be situated at the same geodetic height. However, deviations are also possible. Finally, more than two turbines may be combined with one another.

The invention may be used with particular advantage in the event of high gradients and in applications in which turbines of small diameter are preferred, for example, for reasons of environmental protection.

It is possible through the measure according to the invention to minimize the setting to zero and thus situate the rotors at the height of the lower water level. The rotors may optionally even be situated above the lower water level. It is also possible to select the speed freely through the flow resistance.

The invention is also applicable in pump storage plants, of course. However, the invention provides further advantages:

A standard product available on the market can be used as the generator, having graduations in the 20 MW range, for example, 40, 60, 80 MW, etc., or also other outputs.

Through the standardization of the concept of a hydropower plant, the participating assemblies are not only cost-effective, but rather can also be delivered rapidly.

A complex drainage system is not necessary, because leakage and emptying streams may flow freely.

Because only little or no excavation is necessary, costly geological surveys or studies are not needed.

The foundation for the powerhouse and for the machine units is significantly simpler and more cost-effective.

The invention is explained in greater detail on the basis of the drawing. In the detailed figures:

FIG. 1 schematically shows a hydropower plant having a Francis turbine and a downstream Kaplan turbine.

Figure 2:
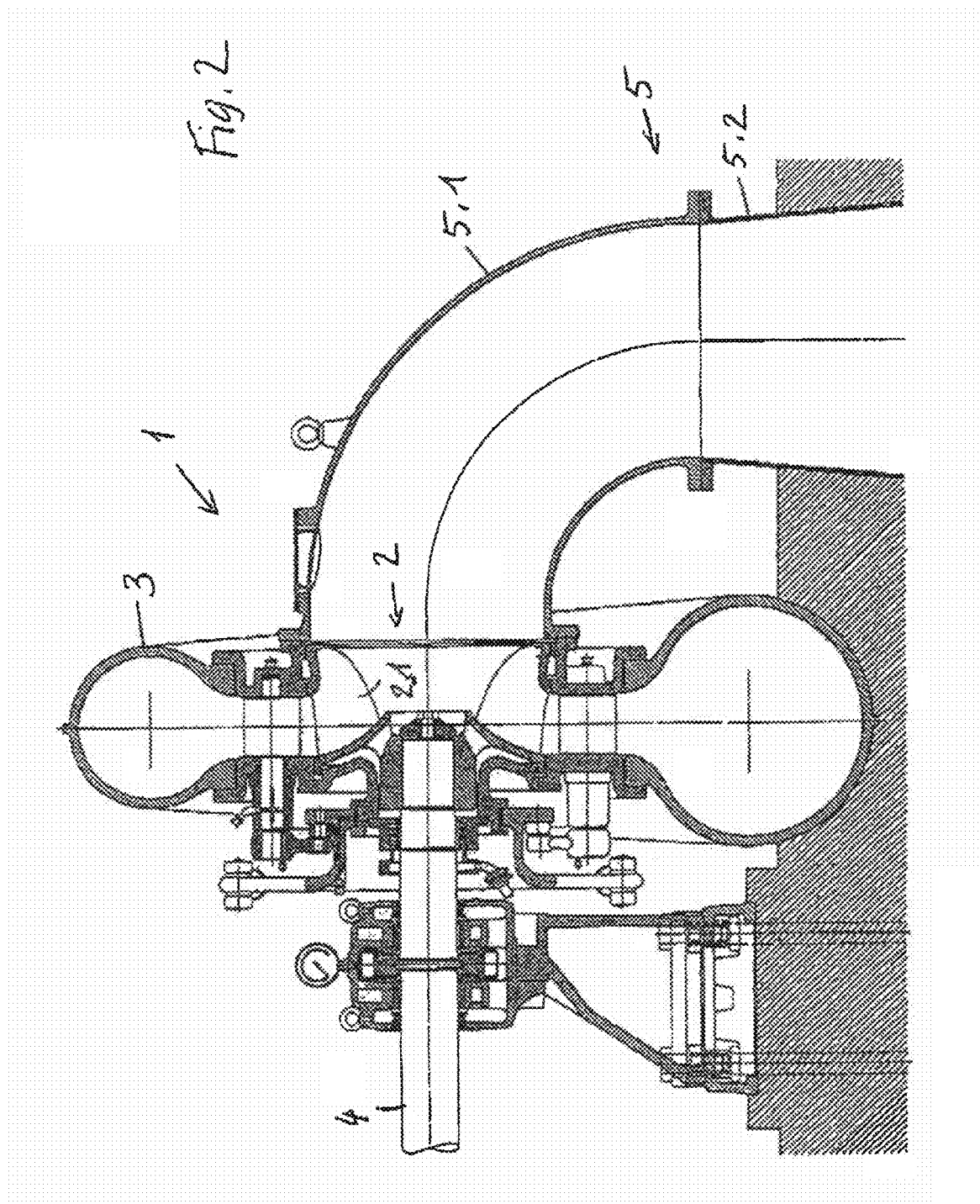

FIG. 2 shows an axial section of a Francis turbine having a horizontal shaft and a further turbine downstream.

Figure 3:
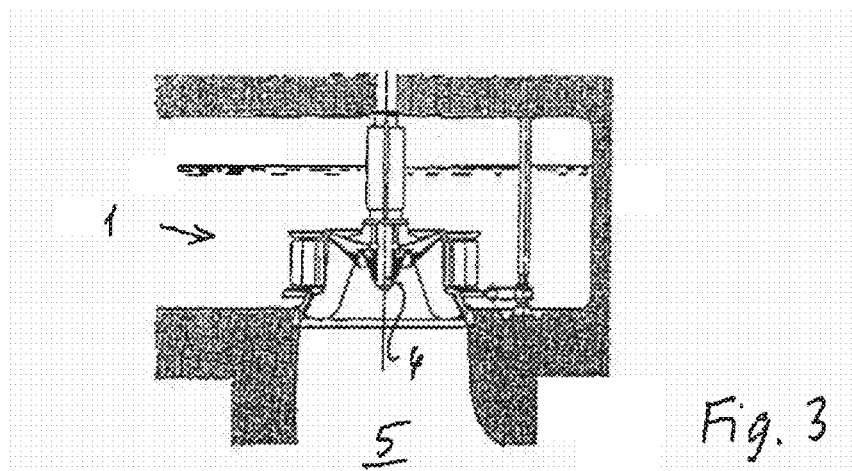

FIG. 3 schematically shows a Francis turbine having a vertical shaft and a further turbine downstream.

Figure 4:
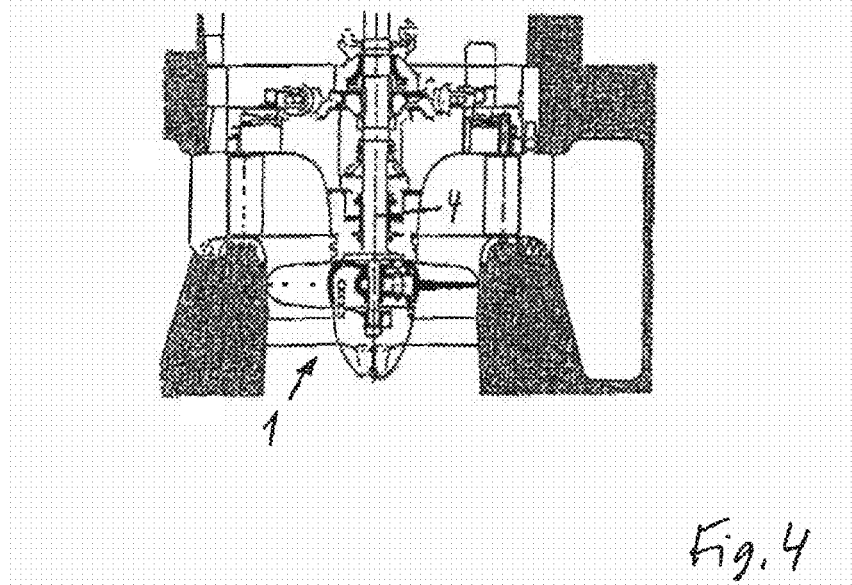

FIG. 4 schematically shows a Kaplan turbine having a vertical shaft and a further turbine downstream.

FIG. 1 illustrates the fundamental principle of the invention. The hydropower plant shown therein comprises an upper body of water 10. It feeds a Francis turbine 1 through a pressure line 20 via a shutoff element 30. The Francis turbine 1 drives a generator 40. After the passage through the turbine, the water flows through a second turbine 50 to the lower body of water 60.

FIG. 2 shows a Francis turbine 1 having a horizontal shaft. It comprises the following essential elements:
a rotor 2 having a plurality of blades 2.1, a spiral housing 3, which encloses the rotor 2, a shaft 4, which is connected rotationally fixed to the rotor 2 and is situated horizontally, a draft tube 5 having an outlet tube 5.2, which expands the manifold.

The turbine drives a generator (not shown here) during operation. Its rotor is also seated on shaft 4.

A further turbine is not shown in greater detail here. It may be situated in the outlet tube 5.2.

A Francis turbine 1 is again shown in FIG. 3. However, it has a vertical shaft 4. A second turbine, which is located in the draft tube 5, but is not shown here, is downstream from the Francis turbine 1.

The turbine 1 shown in FIG. 4 is a Kaplan turbine. It has a vertical shaft 4.

A second turbine (not shown here) is also downstream from this turbine.

If the hydropower plant comprises two or more turbines which are connected in series, they may be situated at the same geodetic level, for example, at the height of the lower water level. Certain deviations upward or downward are possible. Upon the selection of the geodetic height of these turbomachines, an effort is to be made for the particular downstream turbomachine to be situated to minimize the setting, and simultaneously to build up a sufficient counter-pressure against an upstream turbomachine by a downstream turbomachine.

The two turbomachines or optionally all turbomachines may have a common shaft, or may each have a separate shaft.

LIST OF REFERENCE NUMERALS 1 turbine
2 rotor
2.1 blades
3 housing
4 shaft
5 draft tube
5.1 manifold
5.2 outlet tube
10 upper body of water
20 pressure line
30 shutoff element
40 generator
50 turbine
60 lower body of water

The invention claimed is:

1. A hydropower plant, comprising:
   a flow pathway which has an upper water level and a lower water level;
   a Francis turbine and a Kaplan turbine which are connected in series in the flow pathway, each said turbine comprising a rotor, a housing and a draft tube;
   the Kaplan turbine being downstream of the Francis turbine in the flow direction.

2. The hydropower plant according to claim 1, wherein the center of gravity of the rotor of the Francis turbine and the rotor of the Kaplan turbine are both located between the upper water level and the lower water level.

3. The hydropower plant according to claim 2, wherein the turbines are of different constructions.

4. The hydropower plant according to claim 3, wherein one of said turbines is at a height of the lower water level.

5. The hydropower plant according to claim 4, wherein the other of said turbines is at the height of the lower water level.

6. The hydropower plant according to claim 2, wherein one of said turbines is at a height of the lower water level.

7. The hydropower plant according to claim 6, wherein the other of said turbines is at the height of the lower water level.

8. The hydropower plant according to claim 1, wherein one of said turbines is at a height of the lower water level.

9. The hydropower plant according to claim 8, wherein the other of said turbines is at the height of the lower water level.

10. The hydropower plant of claim 1, wherein the Francis turbine viewed in the flow direction comprises one of a radial, semi-axial, and axial flow turbine; and
    the Kaplan turbine viewed in the flow direction comprises one of a radial, semi-axial, and axial flow turbine.

11. The hydropower plant according to claim 1, wherein the center of gravity of the rotor of the Francis turbine and the rotor of the Kaplan turbine are located above the lower water level.

12. The hydropower plant according to claim 1, wherein the center of gravity of the rotor of the Francis turbine and the rotor of the Kaplan turbine are located below the lower water level.

13. The hydropower plant according to claim 1, wherein one of said turbines is above a height of the lower water level.

14. The hydropower plant according to claim 13, wherein the other of said turbines is above the height of the lower water level.

15. The hydropower plant according to claim 1, wherein one of said turbines is below a height of the lower water level.

* * * * *